United States Patent [19]

Gregg

[11] Patent Number: 4,467,496

[45] Date of Patent: Aug. 28, 1984

[54] HEAVY DUTY POLYMERIC SPRING MEMBER AND COMBINATION OF SPRING AND CASTOR CONSTRUCTION

[75] Inventor: John D. W. Gregg, Newtownabbey, Northern Ireland

[73] Assignee: Wheel Developments Limited, Belfast, Northern Ireland

[21] Appl. No.: 319,395

[22] Filed: Nov. 9, 1981

[30] Foreign Application Priority Data

Nov. 10, 1980 [GB] United Kingdom ............... 8036045
Nov. 10, 1980 [GB] United Kingdom ............... 8036046

[51] Int. Cl.³ ............................................. B60B 33/00
[52] U.S. Cl. ....................................... 16/18 B; 16/44; 16/DIG. 36
[58] Field of Search ............ 16/18 B, 44, 47, DIG. 36

[56] References Cited

U.S. PATENT DOCUMENTS

| | | | |
|---|---|---|---|
| 1,105,379 | 7/1914 | Schulze | 16/18 B |
| 2,123,707 | 7/1938 | Bloch | 16/18 B |
| 2,453,916 | 11/1948 | Inskeep | 16/44 |
| 2,914,340 | 11/1959 | Black | 16/44 X |
| 2,923,961 | 2/1960 | Black | 16/44 |
| 2,942,698 | 6/1960 | Bolinger | 16/44 X |
| 2,980,944 | 4/1961 | Bolinger | 16/44 X |
| 2,987,752 | 6/1961 | Black | 16/44 |

FOREIGN PATENT DOCUMENTS

60392 12/1947 Netherlands .............. 16/18 B

Primary Examiner—Fred Andrew Silverberg
Attorney, Agent, or Firm—Sandler & Greenblum

[57] ABSTRACT

A spring member comprises an annular polymeric structure 1 interrupted by gap 3 to define annular structure ends 4 provided with attachment adaptions, external at 8 and internal at 6. Thus wheel 12 journalled at 7 in extension 6 is resiliently mounted by virtue of the elasticity of the annular structure material. Proportions, dimensions and materials can be varied over a wide range of applications. A particularly valuable application of such a C-shape spring is in the provision of a resiliently mounted castor wheel with a resiliently mounted pilot wheel giving easy passage up over a door sill or the like.

9 Claims, 21 Drawing Figures

HEAVY DUTY POLYMERIC SPRING MEMBER AND COMBINATION OF SPRING AND CASTOR CONSTRUCTION

This invention relates to spring members, primarily although not exclusively suitable and intended for support of a moving or vibrating article against gravity.

Support members for the above function include inter alia helical compression springs, leaf springs, and pneumatic support cylinders. In each case the moving parts of the support member extend generally away from the point of attachment or pressure.

The present invention provides a spring member of different shape which can if desired by utilised in a support environment in which the resilient movement of the spring takes place predominantly in the vicinity of, or around, one of the attachment or pressure points.

In one aspect the invention provides a spring member having (a) a first and a second attachment adaptation secured to or integral with a first and second end, respectively, as defined by a single gap in a circular annular structure of resilient synthetic polymeric material, the cross-sectional area and cross-sectional shape of the annular structure, and the difference between its internal and external radii, allowing suitable resilience against opening and closing of the gap of the annular structure and (b) a configuration or adaptation to resist twisting deformation of the annular structure side surfaces out of planes initially generally occupied thereby.

The annular extent of the annular structure, defined as an angle measured around the annulus between the outer extremities of the gap, preferably ranges from 200° to 350°. Most preferably it is from 270° to 330°.

The annular structure can be a single annulus. Preferably, it is generally provided with flat side surfaces, although toroidal or other structures are also possible. If it has flat side surfaces in this way they can be ribbed to provide a configuration to resist deformation by twisting. For example, each surface can have a single rib coaxial with the annulus itself and integral with the surface. Alternatively, separate flat substantially rigid discs e.g. by metal can be firmly located one at each such surface to give a suitable adaptation for such resistance to twisting deformation. Such discs can be movable with respect to both ends of the annular structure, or can be attached to one or other end.

The annular structure can be formed as two or more circular annuli, in which case it is preferable that the annuli have the same internal radii, the same external radii, and centres lying on a straight line at right angles to each annulus. Again, flat-sided annuli are usually envisaged. It will be appreciated that the cross-sectional area of the annular structure is the combination of the cross-sectional areas of the separate annuli. Preferably, two such annuli are envisaged, in most cases spaced apart with flat sides which are parallel. One or both of the first and second attachment adaptations can be arranged in common to each annulus, as discussed in more detail below.

While the absolute size of such an annular structure as defined above can vary, it will generally speaking the within the range of 1.25 cm diameter to 30 cm diameter measured diametrally between the outer circumference. The relative proportions of the inner and outer radii of the annulus depend to a large extent upon the resilient material chosen. Generally speaking, the ratio of the smaller to the larger diameter will run from 1:3 up to 4:5. Most preferably, it lies between the limits of 1:2 to 2:1.

The quantity expressed by the total cross-sectional annulus area divided by the difference in radii can vary over a suitable range and to some extent depends upon the actual cross-sectional area. Usually, however, it ranges from half to twice the magnitude of the difference in radius and most preferably is about the same as this quantity. This is particularly preferred if a single annulus, or a simple double annulus, is used as the annular structure.

It is most preferred to provide one of the attachment adaptations at or near the annulus centre. For example, it can be a single integral radial connection, of the same or of a similar transverse cross-section to that of the annulus, and can extend from the centre of the annulus to one end of the interrupted annular structure. The centre of such an attachment adaptation can have a transverse bore for a support member or for a supported member. Where such a transverse bore is provided it can be constituted as, or further provided with, a bearing surface. In such a case, a wheel or like rotary member (such as a castor for furniture) can be mounted coaxially with the annular structure. Thus, when the wheeled article is moved it is provided with a spring support which centres at, and is closely located around, the axis of rotation.

Provision of an internal attachment adaptation in this way gives the possibility of altering the internal circumference relative to the external circumference, thus affecting the flexibility of the spring as discussed in more detail below.

It will be appreciated that a wheel or castor arrangement as supported in such an annular structure, whether or not provided as a unitary article, is another aspect of the invention.

Another attachment adaptation, particularly but not exclusively in combination with the above, can be constituted by an external, and usually generally tangential, extension to the circular annular structure. By "generally tangentially" it is intended to include extensions, whether integral or not, at an angle of up to 45° from a true tangential direction. Such an external extension can again be of the same or similar cross-section to that of the annular structure itself. It is often however convenient for it to be of a greater cross-sectional area in view of its load-bearing function. Optionally, it can be provided with a portion for attachment to a further frame structure. Such a portion can be a fixing bracket with a flat surface preferably lies at an angle between for example 25° to 75° and more preferably 30° to 60° (e.g. 45°) to the tangential direction. The extension, whether internal or external, can lie in the same general plane as the annular structure, or can project from that plane.

Thus, in combination, there can be provided the internal radial extension and an external tangential extension, which may in some cases extend generally parallel to each other. Provided some gap is left in tha annular structure and the load-bearing strain has a component across this gap, some spring effect will be achieved.

The device is not to be confused in its action with the action of a spiral spring. In the use of a spiral spring, a central axis is rotated, giving an inward contraction to the coils. In the present invention a force is counterbalanced by the force needed to close a gap between the ends of an interrupted annular structure.

An overload on the spring member can eventually (in preferred embodiments) bring the two ends of the annular structure into contact thus preventing damage and breakage. The two ends may be specially shaped to facilitate such contact and give support, rigid or otherwise, in the event of such an overload.

While it is preferred for one attachment adaptation to be at or near the centre, it is possible for both such adaptations to be located generally externally to the annular structure.

The invention extends to a support structure containing as a spring member more than one such interrupted annular structure, whether as an integral portion thereof or as an attachment thereto.

The invention still further extends to a wheeled or like vehicle having as a suspension connected between the axis of rotation and the vehicle frame one or more such spring members as defined above, preferably with the rotary axis of the wheel or like member lying within the loop of the annular structure. Thus, the invention can be applied to wheelbarrows, wheelchairs, trolleys, bicycles, or similar light vehicles.

In a yet further aspect the invention provides a castor for furniture comprising: a vertical castor axis; at least one load-bearing castor wheel the axis of rotation of which does not intersect the castor axis; at least one further wheel of smaller diameter than the or each castor wheel journalled around an axis which is (a) parallel to that of the castor wheel (b) displaced from the castor wheel in the same direction as the vertical axis, and (c) lies at a height greater than the radius of the or each further wheel above that notional support plane to which the castor axis is vertical and on which the or each load-bearing wheel rests; and the same vertically resilient mounting of two different vertically resilient mountings, including a spring member as defined above for the or each castor wheel and the or each further wheel; whereby when the or each further wheel encounters a raised portion of the notional support plane, of less height than of its axis above the plane, it is temporarily and resiliently received thereon to facilitate transfer of the or each load-bearing wheel thereto.

The axis of the or each further wheel can be on the same side of the vertical axis as the axis of the or each load-bearing wheel; or it can be substantially on that vertical axis; or it can even be beyond that axis. In each case, it is displaced from the axis of the or each load-bearing wheel in the same direction as the vertical axis although to a greater or less extent.

Since the axis of the or each load-bearing wheel trails behind the vertical castor axis, the or each further wheel acts as a pilot wheel or wheels to absorb the shock of pushing the article of furniture up over a small step e.g. a door sill.

In a modification of this aspect of the invention, the or each vertically resilient mounting can comprise a first and second member hinged together and separated by a resilient spring or elastomeric support. The lower member can carry the or each further wheel and the pivot around the or each load-bearing wheel of the castor. The upper member is suitable and intended for attachment to the article of furniture. Thus, the resilience of the spring or elastomer absorbs the shock of moving up to a door sill or edge of carpet or the like.

In the practice of the present invention as applied to such castor wheels, in addition to the two attachment adaptations already recited, a third attachment adaptation may extend from one or other end of the annular structure and carry the or each further wheel journalled therein, thus utilizing the resilience of the annular structure as the vertically resilient mounting.

For example, the annular structure can be in the form of two parallel generally C-shaped portions attachable to an article of furniture at a common yoke member extending from the upper part of one end of the C-shape, each portion having as a second attachment adaptation an inwardly radial extension journalling the support wheel and having as a third attachment adaptation, extending also from the lower portion of the C-shape, a generally tangentially directed extension possessing an outer end journalling the or each further wheel. In such a case, the or each further wheel is resiliently mounted by virtue of the resilience of the material and shape of the annular structure, and this takes up the stresses of moving to a door sill or carpet. Additionally, the or each load-bearing wheel itself is journalled in the radial extension and is thus also resiliently mounted in relation to the yoke member when this is attached to an article of furniture.

The or each further wheel can either be a single roller mounted between two arms or can be two wheels mounted one on each end of a single shaft passing through the two arms, or on separate shafts one in each arm. In the latter case, the opportunity is presented of positioning the further wheel shaft or shafts sufficiently close to the load-bearing wheel shaft that the further wheel or wheels overlap in appearance with the load-bearing wheel or wheels, thus giving a more compact structure.

In a particularly preferred embodiment of the invention there is utilised a C-shaped annular structure as described above for the shaft of the load-bearing wheel or wheels (thus conferring a resilience in such wheel) having integral therewith as the vertically resilient mounting a subsidiary C-shaped annular structure for journalling the shaft of the or each further wheel, for example in an internal radial extension of the C-shape.

Although the invention is defined primarily in terms of the assembled castor, it will be appreciated the mountings for the load-bearing and further wheels, without the wheels being assembled thereto, also constitute a separate aspect of the invention especially in the case of the integral annular structures of polymeric material.

The invention will be further described with reference to the accompanying drawings, in which.

Figure 1:
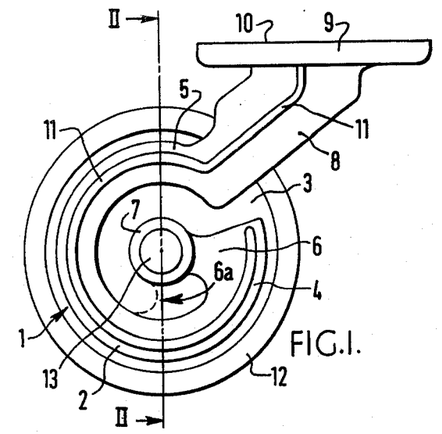
FIG. 1 is a side view of an annular structure having a wheel journalled therein.
Figure 2:
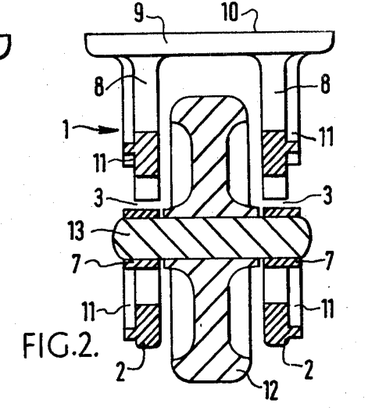
FIG. 2 is a cross-section through II—II of FIG. 1 taken in the direction of the arrows.

In FIGS. 1 and 2 an annular structure 1 consists of two flat-sided parallel circular annuli 2 of synthetic polymer material the ratio of the internal to external diameter being 2:3 in each case and the centres lying on a line at 90° to the flat sides of each annulus. The combined thickness of the two annuli is approximately the same as the difference between the internal and external radii.

There is an identical gap 3 in each annulus, the gaps being aligned and the annular extent of the annulus, in the example shown, being about 340° measured around the circumference between the extremity of ends 4 and 5 defined by the gap.

Each end 4 has an attachment adaptation formed by a single integral radial connection 6, of cross-section similar to that of each annulus terminating in an integral bearing ring 7.

The ends 5 each have an attachment adaptation formed by an external projection 8 at about 40° to the tangential direction, the two projections 8 being linked by an integral transverse yoke 9 with a flat fixing surface 10 again at an angle of about 40° to the general extension of projections 8.

A rib 11 extends around the outer flat face of each annulus 2 and along projection 8 to the flat fixing surface 10.

All the above structure is integrally moulded in resilient polymer material such as polyethylene, polypropylene or polyvinylchloride.

The annular structure 1 is shown with a ground wheel 12, with axle 13, carried in bearing rings 7.

When this combination is loaded, e.g. when attached by fixing surface 10 to a frame of a vehicle, the resultant pressure acts to close gaps 3. Excess pressure causes the ends 4 and 5 to contact each other, thus, preventing failure of the spring. The flexibility of this spring member is governed by material and relative sizes of internal and external radii and annuli thicknesses. It is also governed by the external and internal annulus circumference; if radial connection 6 had a thicker root e.g. as shown by dotted line 6a the effective resilient arc length of each annulus would be reduced.

The combined thickness of the annuli 2 constituting the annular structure, and the assistance of strengthening ribs 11 prevent a twisting deformation in use.

Figure 3:
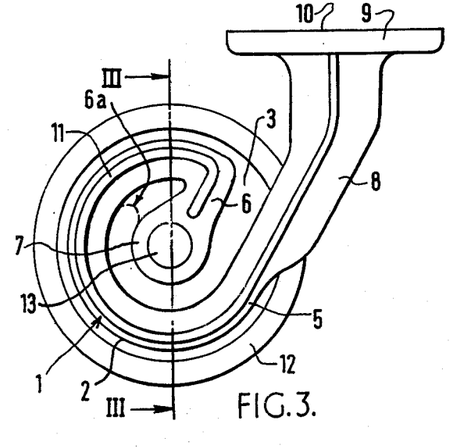
FIG. 3 is a side view of a different embodiment of annular structure and wheel journalled therein.
Figure 4:
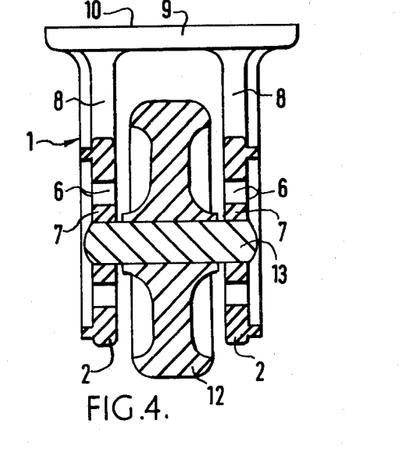
FIG. 4 is a cross-section through III—III of FIG. 3.

FIGS. 3 and 4 show a generally similar annular structure, and the same reference numerals are accordingly used. However, in these Figures the integral radial connection 6 is generally parallel to the external projection 8, as shown, the weight of a load fixed to flat surface 10 tending to open the gap 3 rather than close it. In this case the internal:external radius ratio is about 3:5.

Figures 5, 6:
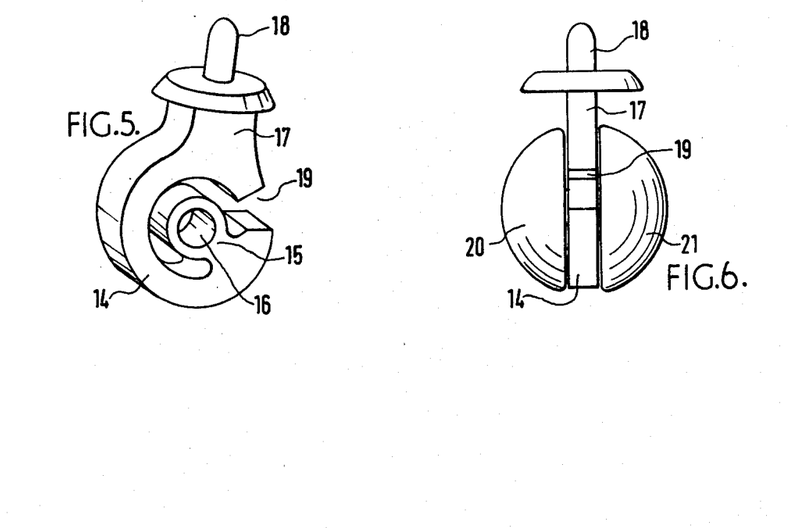
FIG. 5 is a perspective view of an annular structure.
FIG. 6 is a view of a castor incorporating an annular structure as shown in FIG. 5.

FIG. 5 shows that a single annulus 14 can provide the annular structure. In this case it has an integrated internal radial connection 15 with central bearing surface 16, and an integral external projection 17 (provided with a central prolongation 18) both extending from the ends defined by gap 19.

FIG. 6 shows how such a spring member can form the central part of a castor construction. The two halves 20 and 21 of the castor are fixed to an axle carried through bearing surface 16, and prolongation 18 being fixed for rotation in the leg of an article of furniture.

Figure 7:
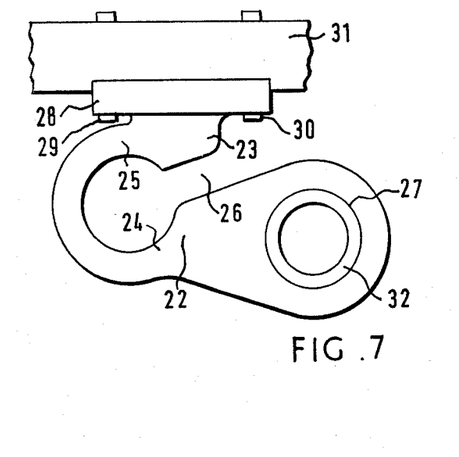
FIG. 7 is a side view of an annular structure attached to a frame.

FIG. 7 shows an embodiment in which both attachment adaptations 22 and 23 are located externally of ends 24 and 25 defining gap 26.

Attachment adaptation 22 has a large diameter opening 27 therein, whereas attachment adaptation 23 is provided with integral fixing bracket 28 having bores 29 and 30 therein. Such an integral structure can be utilised to connect in a resilient fashion two frame members 31 and 32 crossing at right angles.

Figure 8:
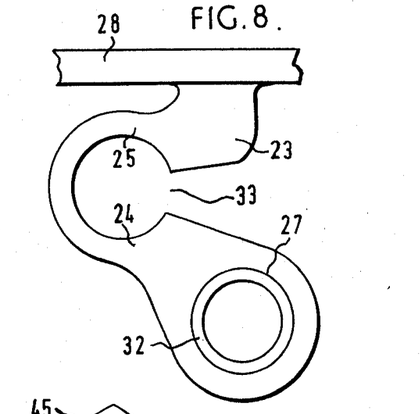
FIG. 8 is a side view of a different annular structure attached to a frame.

FIG. 8 shows a similar structure to that of FIG. 7, in which the gap 33 is between the frame members (reckoned in the vertical direction shown) rather than to one side of frame member 32 as shown in FIG. 7.

Figures 9, 10:
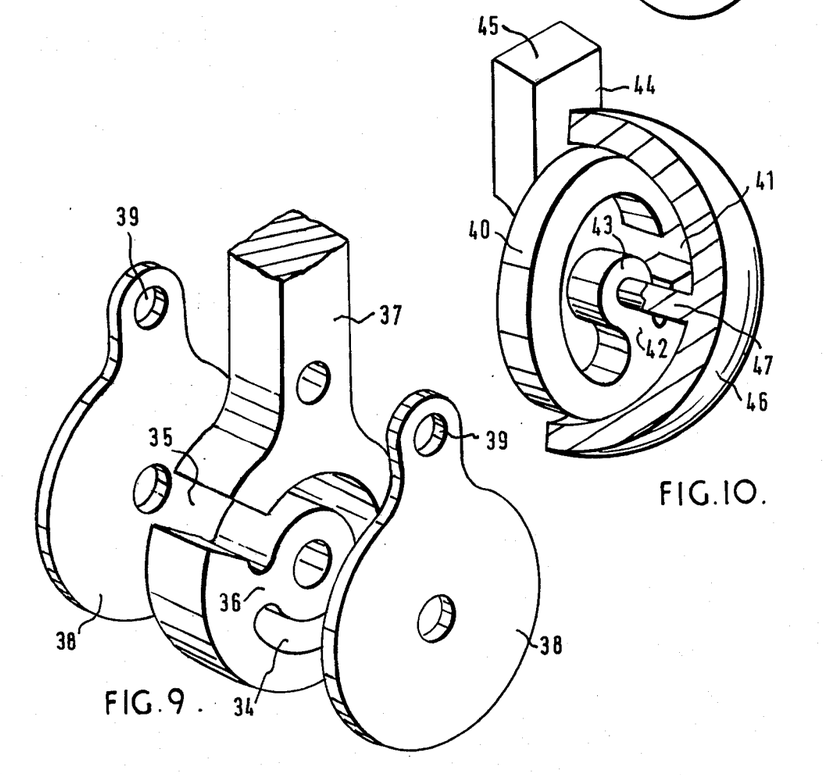
FIG. 9 shows in perspective view an annular structure provided with side surface metal discs.
FIG. 10 shown in broken-away perspective view an annular structure with an attachment adaptation.

FIG. 9 shows an integral spring member of a similar nature to those described above, having a single annulus 34 and a gap 35, internal radial connection 36 and external projection 37 of elongated form, also projecting radially from the annulus at an angle of about 45° to the internal radial connection 36. Projection 37 can be attached to a frame member of a light wheeled vehicle. To ensure that the forces applied do not lead to twisting of the annulus, metal plates 38 are clamped one to each side face, and for extra security can be bolted at 39 to the projections 37, as shown, to move therewith.

FIG. 10 illustrates that the attachment adaptations need not lie in the same general plane as each other or as annulus. In FIG. 10 an annulus 40 with gap 41 has integral internal radial connection 42 with central bearing hole 43, and external projection 44 also integral with the annulus but stepped backwards therefrom, as shown, terminating in a mounting prolongation 45. An externally hemispherical castor wheel 46 with shaft 47 is journalled in bearing 43, as shown, whereby the resilient movement of the spring member is totally enclosed and limited against excess by the abutment of castor wheel 46 on the periphery of annulus 40.

Figure 11:
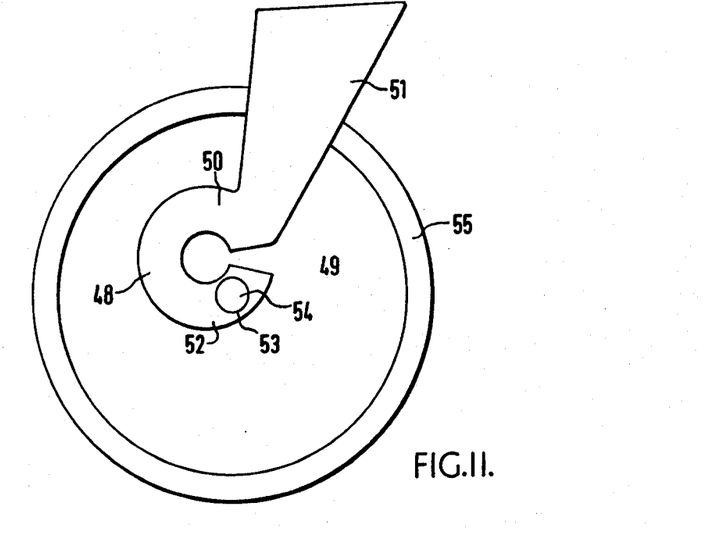
FIG. 11 shows in side view a yet further annular structure.

FIG. 11 illustrates that the attachment adaptation need not necessarily be a projection portion or member, but can be a formation or member within one defined end of an annulus. In FIG. 11 an annulus 48 with gap 49 has at end 50 an integral external projection 51 which is linked by a transverse yoke to its counterpart, not shown, in the manner described above in relation to FIGS. 2 and 4. However, at the other end 52 there is a through hole 53 which constitutes an attachment adaptation for carrying shaft 54 (jointly with its counterpart hole on the other projection 51 not shown) on which is mounted for rotation wheel 55. Resilience is still achieved by the opening and closing of gap 49, but the rotation axis of wheel 55 is not the same as the axis of the annular structure.

Figure 12:
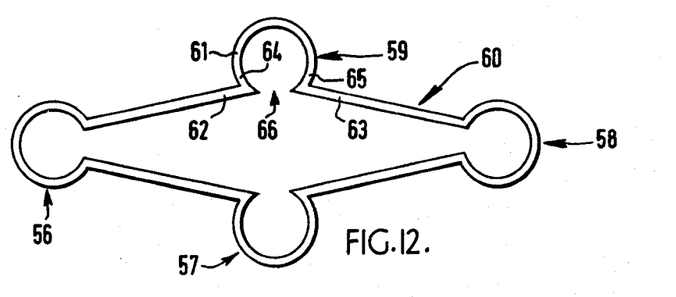
FIG. 12 is a diagrammatic view of a support member incorporating two annular structures.
Figure 13:
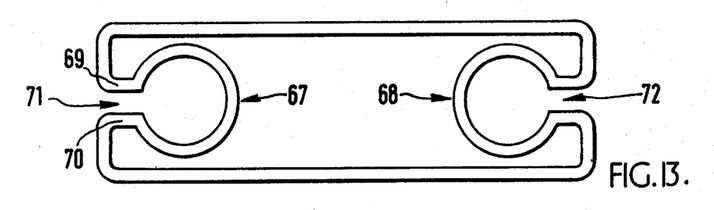
FIG. 13 is a side view of a further form of support member incorporating two annular structures.

FIGS. 12 and 13 demonstrate that composite members may be made with more than one annular structure as described above.

In FIG. 12 four annular structures 56–59 are provided in a single integral polymer moulding 60. Each has an annulus e.g. 61 with two arms e.g. 62 and 63 extending away from ends 64, 65 defining a gap as at 66. If vertical pressure is exerted, annular structures 56, 58 tend to close and structures 57, 59 tend to open.

In FIG. 13 a composite member with two annular structures 67, 68 is shown. Each structure has two parallel external attachment adaptations e.g. 69,70 integral with the shorter sides of the composite member. Both gaps 71,72 thereby defined tend to close if pressure is exerted.

FIGS. 14 to 17 show a particular preferred combination utilising the spring members described above.

Castors for furniture possess load-bearing wheels of small diameter, typically less than 5 cm. This has a disadvantage if the article of furniture is to be moved over an irregularity in the floor. For example, if it is to be moved through a doorway containing a slightly raised sill, the small-diameter load-bearing castor wheel bumps into the sill and jars the furniture and any contents. This is especially so when moving up over an obstruction; moving down off an obstruction can usually be more controlled. In the case of a food or drink trolley, or of a television receiver, this shock can cause damage to the furniture or contents.

Figure 14:
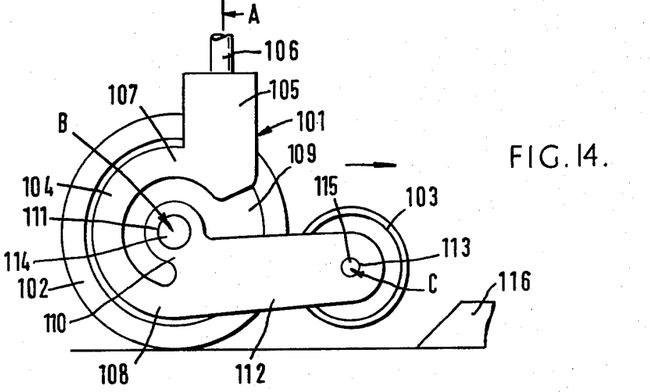
FIG. 14 is a side view of one embodiment of a castor according to the invention.

In FIG. 14 a castor possesses a mounting generally indicated at 101, a load-bearing wheel 102 and a further pilot wheel 103.

Mounting 101 is an integral polymeric structure shaped with two parallel C-shaped members 104 (only one is visible) joined by a yoke 105 carrying a vertical shaft 106. Each C-shaped member has an end 107 (attached to the yoke) and an end 108 defining between them gap 109. End 108 has two adaptations, the internal radial extension 110 with central bearing opening 111, and a generally tangential external extension 112 with a bearing opening 113 towards its outer end.

Load-bearing wheel 112 is journalled within the yoke by shaft 114 in bearing openings 11. Pilot wheel 103 is of smaller diameter than load-bearing wheel 102 and is journalled by shaft 115 within parallel extensions 112 and in bearings openings 113, so that its circumference is above floor level.

Vertical axis A is displaced from horizontal load-bearing wheel axis B. Pilot wheel axis C is parallel to axis B, and displaced therefrom in the same direction as axis A.

In use, if the castor is pushed in the direction of the arrow the axis B will trail in relation to axis A, as is conventional with castors. Thus wheel 103 will lead the assembly, as a pilot wheel. Because extension 112 is attached to end 108 it is vertically resilient in relation to the castor, since the C-shaped structure tends to open or close to absorb transient loads. Thus, when pilot wheel 103 encounters door sill 116 it will ride up resiliently and lift the load-bearing wheel 102 up without substantial shock and eventual damage to the castor or to the furniture and any contents.

Figure 15:
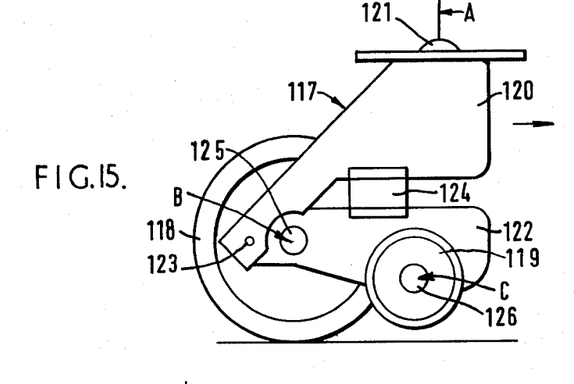
FIG. 15 is a side view of a second embodiment of a modified castor.

In FIG. 15 (which shows a modified form of the invention) the castor possesses a mounting 117, a load-bearing wheel 118 and two further wheels 119 (only one visible) to act as pilot wheels.

Mounting 117 has two parallel upper metal portions 120, only one shown, yoked together and provided with a fixing member 121, and two lower metal portions 122 (only one shown) parallel to each other and pivoted to the upper portions at 123, being spaced therefrom by an elastomeric block 124.

Load-bearing wheel 118 is journalled at shaft 125 in one end of each lower portion 122, and further wheels 119 (only one shown) are journalled on a common shaft 126, each outside the lower portion 122 as shown.

Axes A, B, and C are as described above in relation to FIG. 1. In this embodiment axis C is on the same side as B in relation to vertical axis A, giving a more compact appearance but generally the same function.

Figure 16:
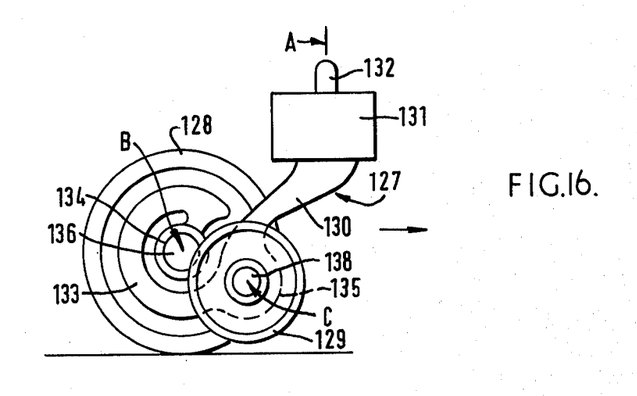
FIG. 16 is a side view of a third embodiment of a castor according to the invention.

FIG. 16 shows a castor with a mounting member 127 load-bearing wheel 128 and two further wheels 129 (only one being visible in the side view illustrated).

Mounting member 127 is a polymer moulding and has two elongate resilient parallel arms 130 joined by a yoke 131 with vertical mounting shaft 132. Each terminates in resilient C-shaped mounting 133 with bearing opening 134 the nature of this structure being generally equivalent to that described above in FIG. 14 except that load tends to open the C-shape rather than close it.

Part-way along each resilient arm 130 there is formed an integral bearing bush 135.

Load-bearing wheel 128 is journalled on shaft 136 in bearing openings 134. Wheels 129 are journalled on each on aligned separate shafts 137 in bearing bush 135. Axes A, B and C are as described above, the vertical axis A being appreciably displaced from the horizontal axes B and C, and a very compact appearance thereby achieved. The castor operates as before.

Figures 17, 20, 21:
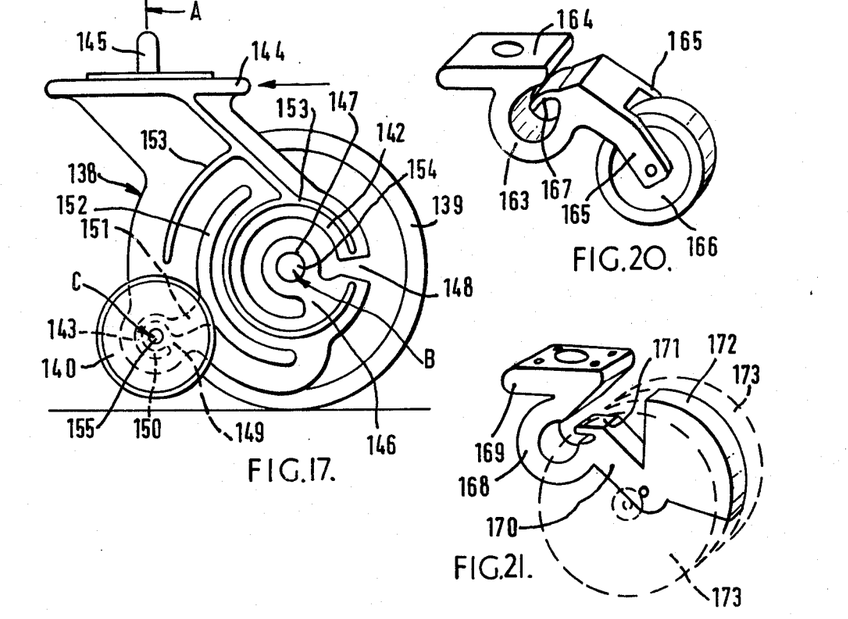
FIG. 17 is a side view of a fourth embodiment of a castor according to the invention.
FIG. 20 shows a yet further resilient mounting bracket.
FIG. 21 shows a yet further mounting bracket.

FIG. 17 shows a castor travelling in the opposite direction to those of FIGS. 14 to 16, having a mounting member 138, a load-bearing wheel 139 and two further wheels 140 (only one shown).

Mounting member 138 has two parallel arms of complex shape, each including a major C-shaped region 142 and a minor C-shaped region 143, joined by a yoke 144 with a vertical fixing shaft 145. It is formed as a moulding of synthetic polymeric material.

Each major C-shaped region 142 has an internal radial extension 146 from one end, provided with bearing surface 147 and is resilient against opening or closing the gap 148.

Each minor C-shaped region 143 also possesses an internal radial extension 149 possessing bearing surface 150. It is resilient against opening or closing of the gap 151 communicating with arcuate opening 152 concentric with the major C-shaped region 142.

Strengthening rib 153 is provided around the major C-shaped region 142 and along the portion joining the upper part of minor C-shaped region 143.

Load-bearing wheel 139 is journalled inside the parallel arms of mounting members 138 by shaft 154 in bearing surfaces 147. Further wheels 140 (only one is visible) are journalled on common shaft 155 in bearing surfaces 150 to lie outside of the parallel arms of mounting member 138.

The resilience of major C-shaped region 142 supports the furniture in normal use. When the castor is moved over e.g. a door sill (as described in relation to FIG. 14) the further wheels temporarily take up the weight, resiliently supporting it within the minor C-shaped region 143, and thus act as pilot wheels to facilitate transfer of the load-bearing wheels to the door sill.

Axis C intersects vertical axis A in this instance, the trailing axis B being spaced from the vertical axis.

The device shown in FIGS. 18 to 21 incorporate the spring members of the invention in largely self-explanatory fashion and will not be described in great detail.

Figure 18:
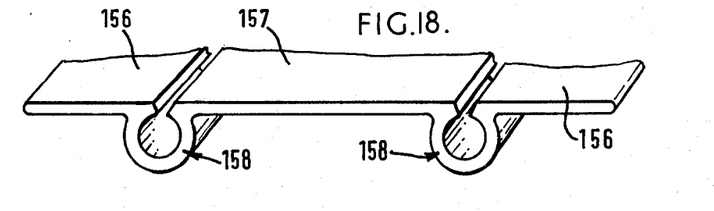
FIG. 18 shows in cross-section a flexible but resilient plane member incorporating a spring according to the invention.

In FIG. 18 the two outer leaves 156 of a thick resilient polymeric plate are connected to a single coplanar inner leaf 157 by C-shaped spring members 158.

Figure 19:
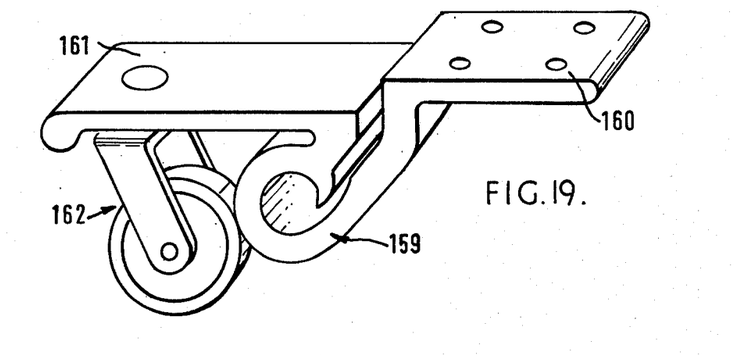
FIG. 19 shows a resilient mounting bracket for a different type of castor wheel.

In FIG. 19 a C-shaped member 159 is interposed between an upper fixing plate 160 and a somewhat lower mounting plate 161 for castor assembly 162, thus leaving space for flexing controlled by the action of spring member 159.

The devices of FIGS. 18 and 19 in particular (also possibly of FIGS. 12 and 13) lend themselves to heavy-duty extrusion techniques.

FIG. 20 shows a further assembly where C-shaped spring 163 integral with fixing plate 164 journals between its forked ends 165 a castor wheel 166. In this instance internal stop 167 is provided, itself of somewhat flexible nature.

FIG. 21 shows a C-shaped spring 168 with a fixing plate 169 integral with one limb and an extension 170 attached to the other limb. Again, an internal stop 171 is provided, as shown. Extension 170 has a quadrant-like termination 172, to provide a neat appearance and safe cooperation with castor wheels 173 shown in dotted lines.

I claim:

1. A spring member comprising:
   (a) a single, substantially circular molded polymeric annulus having two side surfaces and a gap located between a first end and a second end of said annulus, the angle subtended between the ends of said annulus, as measured about said annulus, being between 200° and 350°, the ratio of the internal diameter of said annulus to the external diameter of said annulus being between 1:3 and 4:5, the total cross-sectional area of said annulus divided by the difference between the external radius of said annulus and the internal radius of said annulus being between one half and twice the difference between said radii, said spring member further comprising an integrally molded member extending from each of said annulus ends and adapted to be attached to means for exerting a force on said spring, and means located on at least one side of said annulus for resisting twisting of said annulus.

2. A spring member in accordance with claim 1 wherein said side surfaces are flat, and wherein said means for resisting twisting of said annulus comprise a coaxial rib integrally attached to each of said surfaces.

3. A spring member in accordance with claim 1 wherein one of said integrally molded members extends from the center of said annulus to one of said annulus ends, said one member comprising a central orifice for attaching said spring member to a wheel or other axis.

4. A spring member in accordance with claim 1 wherein one of said integrally moled extensions extends generally tangentially outwardly from one of said annulus ends.

5. A spring member in accordance with either of claims 1 or 3 in combination with a castor wheel assembly, said wheel assembly including a castor wheel and having vertical castor axis, said castor wheel having an axis of rotation which does not intersect said vertical castor axis, a guide wheel having a diameter smaller than the diameter of said castor wheel, said guide wheel being journalled about an axis which is parallel to the axis of said castor wheel, which is displaced from said castor wheel in the same direction as said vertical axis, and which is located at a height above a plane on which said wheel rests which is greater than the radius of said guide wheel, said spring member being attached to said castor wheel and to said guide wheel, wherein when said guide wheel encounters a raised portion along said support plane having a height less than the height of the axis of said guide wheel above said plane, said spring comprises means for temporarily and resiliently transferring forces exerted on it by said raised portion to said load bearing wheel.

6. A spring member comprising:
   (a) two substantially circular, molded polymeric annuli, said annuli being substantially coaxial, each annulus having two side surfaces and a gap located between a first end and a second end of said annulus, the angle subtended between the ends of each annulus, as measured about said annulus, being between 200° and 350°, the ratio of the internal diameter of said annulus to the external diameter of said annulus being between 1:3 and 4:5, the total cross-sectional area of said annulus divided by the difference between the external radius of each annulus and the internal radius of each annulus being between one-half and twice the difference between said radii, each annulus further comprising an integrally molded member extending from each of said annulus ends and adapted to be attached to means for exerting a force on said spring, and means located on at least one side of said annulus for resisting twisting of said annulus.

7. A spring member in accordance with claim 6 wherein each side surface is flat and wherein said means for resisting twisting of said annulus comprise a coaxial rib integrally attached to located each of said surfaces.

8. A spring member in accordance with claim 6 wherein an integrally molded member extends from said center of each annulus to one of said annulus ends, said member including a central orifice for attaching said spring member to a wheel or other axis, each of said integrally molded members extending from common axes of said annuli to one end of an aligned pair of said annuli ends.

9. A spring member in accordance with any of claims 6, 7, or 8 in combination with a castor wheel assembly, said wheel assembly including a castor wheel and having vertical castor axis, said castor wheel having an axis of rotation which does not intersect said vertical castor axis, a guide wheel having a diameter smaller than the diameter of said castor wheel, said guide wheel being journalled about an axis which is parallel to the axis of said castor wheel, which is displaced from said castor wheel in the same direction as said vertical axis, and which is located at a height above a plane on which said wheel rests which is greater than the radius of said guide wheel, said spring member being attached to said castor wheel and to said guide wheel, wherein when said guide wheel encounters a raised portion along said support plane having a height less than the height of the axis of said guide wheel above said plane, said spring comprises means for temporarily and resiliently transferring forces exerted on it by said raised portion to said load bearing wheel, one annulus positioned on each side of said castor wheel, said annuli together comprising means for supporting said guide wheel.

* * * * *

UNITED STATES PATENT AND TRADEMARK OFFICE
CERTIFICATE OF CORRECTION

PATENT NO. : 4,467,496

DATED : August 28, 1984

INVENTOR(S) : J.D.W. GREGG

It is certified that error appears in the above-identified patent and that said Letters Patent is hereby corrected as shown below:

Column 1, line 62 of the issued patent, "the" should be changed to ---be---.

Column 10, line 36 of the issued patent, (in line 4 of claim 7) "located" should be deleted.

Signed and Sealed this

Fifth Day of February 1985

[SEAL]

Attest:

DONALD J. QUIGG

Attesting Officer     Acting Commissioner of Patents and Trademarks